(12) United States Patent
Sandhage (10) Patent No.: US 11,931,819 B2
(45) Date of Patent: Mar. 19, 2024

(54) METHODS FOR MANUFACTURING CERAMIC AND CERAMIC COMPOSITE COMPONENTS AND COMPONENTS MADE THEREBY

(71) Applicants: Purdue Research Foundation, West Lafayette, IN (US); Georgia Tech Research Corporation, Atlanta, GA (US)

(72) Inventor: Kenneth Henry Sandhage, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 1323 days.

(21) Appl. No.: 16/338,734

(22) PCT Filed: Oct. 5, 2017

(86) PCT No.: PCT/US2017/055361
§ 371 (c)(1),
(2) Date: Apr. 2, 2019

(87) PCT Pub. No.: WO2018/067830
PCT Pub. Date: Apr. 12, 2018

(65) Prior Publication Data
US 2019/0381600 A1    Dec. 19, 2019

Related U.S. Application Data

(60) Provisional application No. 62/404,404, filed on Oct. 5, 2016.

(51) Int. Cl.
*B23K 20/12* (2006.01)
*C04B 35/56* (2006.01)
(Continued)

(52) U.S. Cl.
CPC ........ *B23K 20/122* (2013.01); *B23K 20/1255* (2013.01); *C04B 35/56* (2013.01);
(Continued)

(58) Field of Classification Search
None
See application file for complete search history.

(56) References Cited

U.S. PATENT DOCUMENTS 6,598,656 B1    7/2003  Sandhage et al.
2002/0076541 A1*  6/2002  Jarmon ................. F23R 3/007
                                                             264/44

(Continued)

OTHER PUBLICATIONS

Lipke, David W. et al., "Near Net-Shape/Net-Dimension ZrC/W Based Composites with Complex Geometries Via Rapid Prototyping and Displacive Compensation of Porosity," Journal of European Ceramic Society, vol. 30, No. 11, (2010), pp. 2265-2277.

(Continued)

*Primary Examiner* — Seth Dumbris
(74) *Attorney, Agent, or Firm* — Hartman Global IP Law; Gary M. Hartman; Domenic N. S. Hartman (57) ABSTRACT

Ceramic and ceramic composite components suitable for high temperature applications and methods of manufacturing such components. The components are formed by a displacive compensation of porosity (DCP) process and are suitable for use at operating temperatures above 600° C., and preferably above 1400° C., and possess superior mechanical properties.

10 Claims, 6 Drawing Sheets

(51) Int. Cl.
*C22C 29/06* (2006.01)
*F01D 5/28* (2006.01)
*C22C 1/08* (2006.01)

(52) U.S. Cl.
CPC .............. *C22C 29/06* (2013.01); *F01D 5/284* (2013.01); *B22F 2998/10* (2013.01); *C22C 1/081* (2023.01); *F05D 2300/603* (2013.01)

(56) References Cited

U.S. PATENT DOCUMENTS

2009/0291011 A1 11/2009 Zhang et al.
2013/0284793 A1* 10/2013 Moriguchi ......... B23K 20/1255
228/2.1

OTHER PUBLICATIONS

Zhao, Yan-Wei et al., "Microstructure and Mechanical Properties of ZrC—W Matrix Composite Prepared by Reactive Infiltration at 1300 C.", International Journal of Refractory Metals and Hard Meterials, vol. 37, (2013), pp. 40-44.
International Search Report and Written Opinion for International Application No. PCT/US2017/055361, dated Jan. 4, 2018, 16 pages.

* cited by examiner

METHODS FOR MANUFACTURING CERAMIC AND CERAMIC COMPOSITE COMPONENTS AND COMPONENTS MADE THEREBY

CROSS REFERENCE TO RELATED APPLICATIONS

This application claims the benefit of U.S. Provisional Application No. 62/404,404, filed Oct. 5, 2016, the contents of which are incorporated herein by reference.

BACKGROUND OF THE INVENTION

The present invention generally relates to high temperature components. The invention particularly relates to mechanically robust ceramic and ceramic composite components for use in high temperature systems.

There are a wide variety of applications that make use of, or would benefit from, mechanically robust components capable of use at elevated temperatures. For example, a number of high-speed machining, threading (fiber handling/processing), rolling, compaction, extrusion, drawing, and joining operations have a need for materials that exhibit one or more enhanced mechanical properties, nonlimiting examples of which include toughness, stiffness, erosion resistance, fracture resistance, creep resistance, thermal shock resistance, and thermal cycling resistance. Once such example is tools for friction stir welding. As known in the art, friction stir welding can be an attractive method for joining metallic materials (metals or metal alloys) without the need for melting of the metallic materials. By avoiding such melting, greater retention of the microstructure and properties of the bulk metallic materials may be achieved in the joined regions.

Currently, friction stir welding can be particularly attractive as a means of joining metallic materials that soften without melting (hereinafter referred to simply as "soften") at relatively low temperatures (as nonlimiting examples, aluminum and its alloys). However, metallic materials that soften at relatively higher temperatures (including but not limited to titanium and its alloys, nickel and its alloys, cobalt and its alloys, and iron and its alloys) require a greater degree of friction-induced heating and higher temperatures to be joined by friction stir welding. The friction stir welding tools need to exhibit higher resistance to erosion, plastic deformation, and fracture when friction welding such materials at correspondingly higher friction-induced temperatures. Current materials used in friction stir welding tools, as examples, tungsten, tungsten alloys, monolithic carbides, and monolithic nitrides (for example, cubic boron nitride (CBN)) are prone to fracturing or exhibit excessive erosion and/or plastic deformation to allow for their use to friction stir weld long lengths of materials that soften at high temperatures (for example, higher than aluminum and its alloys) and/or are expensive to fabricate in complicated shapes typically desired for friction stir welding tools.

Other applications that make use of, or would benefit from, mechanically robust components capable of use at high temperatures include certain types of components and tooling used in forming operations, joining operations, and engine applications. Nonlimiting examples of the former include tooling used in hot compaction, hot extrusion, hot pressing, hot drawing, and hot rolling operations, and particularly dies, molds, and rollers used in such operations and that have a need for materials that exhibit one or more of the previously noted enhanced mechanical properties. Depending on the particular application, engine components may have additional desired properties.

Current advanced turbine blades for high temperature turbine engine operation are often formed of single-crystal nickel-based superalloys with internal cooling channels and thermal barrier coatings. Thermal barrier coatings and internal cooling channels serve to lower the operating temperatures of turbine blades, so that the nickel-based superalloy (or other high-temperature alloy) can retain sufficiently high stiffness, creep resistance, and fracture toughness at high temperatures. In order to further increase the efficiency and performance of turbine engines, there is a desire to operate such turbine engines at higher temperatures than are presently used which, in turn, creates a desire to develop turbine blades (and other components in the hot section of the turbine) comprising materials capable of operation at higher temperatures than are possible with current metal alloy-based turbine blade materials. There is also a desire to produce such higher temperature turbine blades in complex shapes via cost-effective processes.

In view of the foregoing, there is an ongoing need for materials suitable for producing mechanically robust components that are capable of use at high-temperatures, for example, well above 600° C. and in some cases above 1400° C., without a significant loss of mechanical and chemical performance. Particularly relating to friction stir welding applications, there is a need for tools that are more resistant to erosion, plastic deformation, creep deformation, and fracture at high temperatures, and that can be fabricated at modest cost in shapes desired for friction stir welding tools. There is also a desire to utilize such friction stir welding tools for the cost-effective friction stir welding of metals and metal alloys that soften at relatively high temperatures, including but not limited to titanium and titanium alloys, iron and iron alloys including steels, nickel and nickel-based alloys (including nickel-based superalloys), and cobalt and cobalt-based alloys.

BRIEF DESCRIPTION OF THE INVENTION

The present invention provides mechanically robust ceramic and ceramic composite components for use in high temperature systems, and methods suitable for producing such components.

According to one aspect of the invention, a mechanically-robust ceramic or ceramic composite component for a high temperature system is formed by reacting a fluid reactant and a porous preform that has a pore volume and contains a solid reactant compound that defines a solid volume of the porous preform. The fluid reactant comprises at least one displacing metal and the solid reactant compound of the preform having at least one displaceable species. The displacing metal of the fluid reactant is capable of displacing the displaceable species in the solid reactant compound to produce at least one solid reaction product. The fluid reactant infiltrates the porous preform and reacts with the solid reactant compound to produce the ceramic or ceramic composite component, during which the displacing metal at least partially replaces the displaceable species to produce the at least one solid reaction product that has a reaction product volume. The pore volume is at least partially filled by the reaction product volume, and the product volume is greater than the solid volume lost by the displaceable species in the solid reactant compound being displaced by the displacing metal of the fluid reactant during the reaction of the fluid reactant and the solid reactant compound. The ceramic or ceramic composite component is more mechanically robust than the porous preform.

Other aspects of the invention include methods of producing components comprising the features described above, and systems containing such components.

Technical aspects of the method and components described above preferably include the capability of the components to be used at high temperatures, for example, well above 600° C. and in some cases above 1400° C., without a significant loss of mechanical and chemical performance.

Other aspects and advantages of this invention will be further appreciated from the following detailed description.

DETAILED DESCRIPTION OF THE INVENTION

Figure 1:
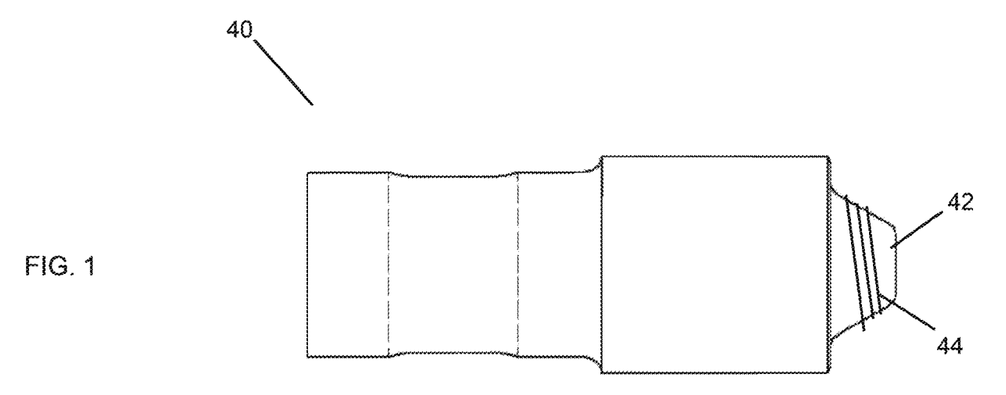
FIGS. 1 and 2 schematically represent side and cross-sectional views of a friction stir welding tool in accordance with a nonlimiting embodiment of the invention.
Figure 2:
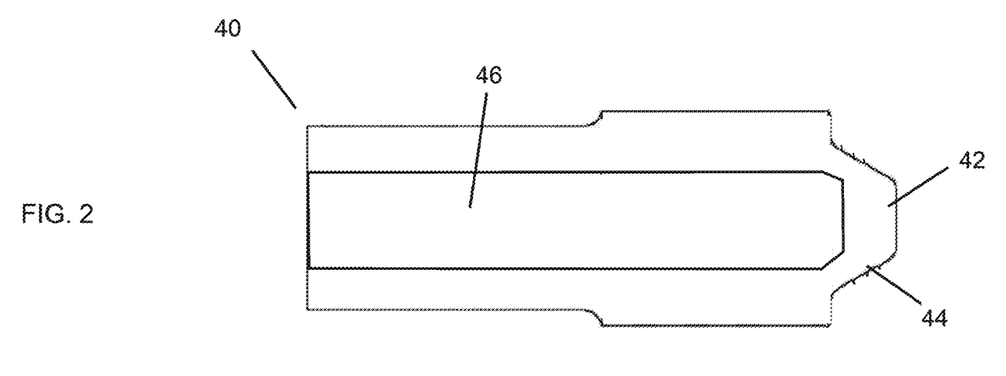
Figure 3:
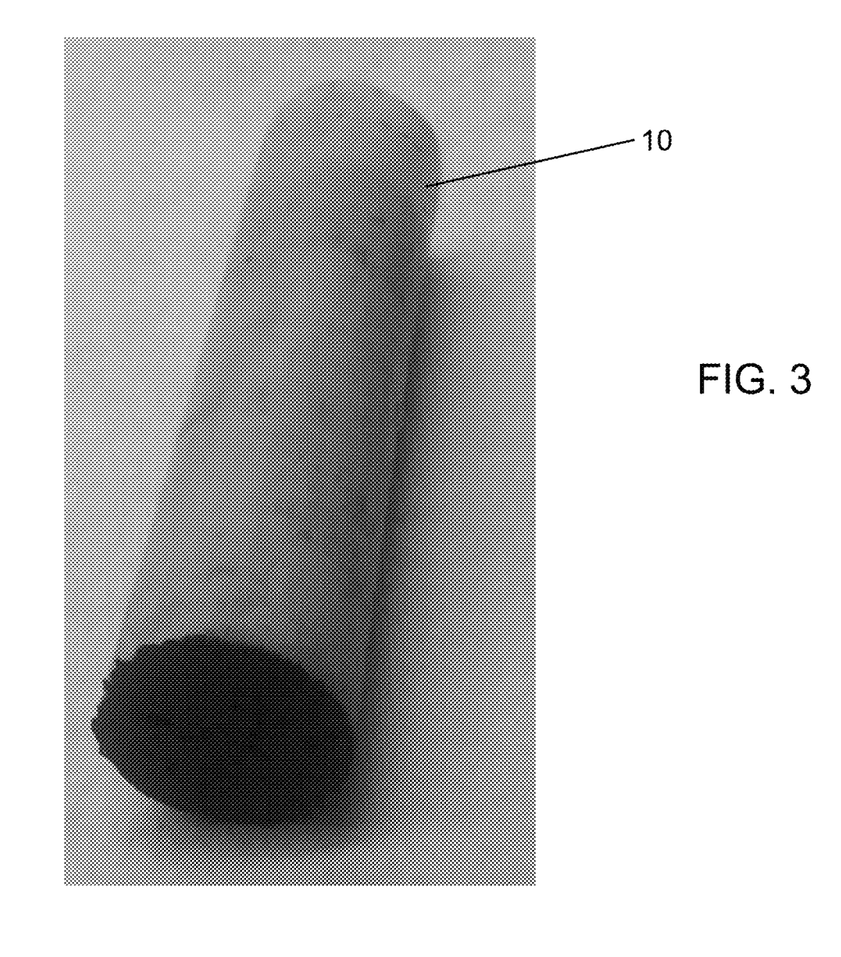
FIG. 3 is an image of a cylindrical-shaped rigid blank preform formed of a mixture of tungsten carbide (WC) powder and polymethyl methacrylate (PMMA) binder that was prepared by pressing the WC/PMMA mixture in a cylindrical die.
Figure 4:
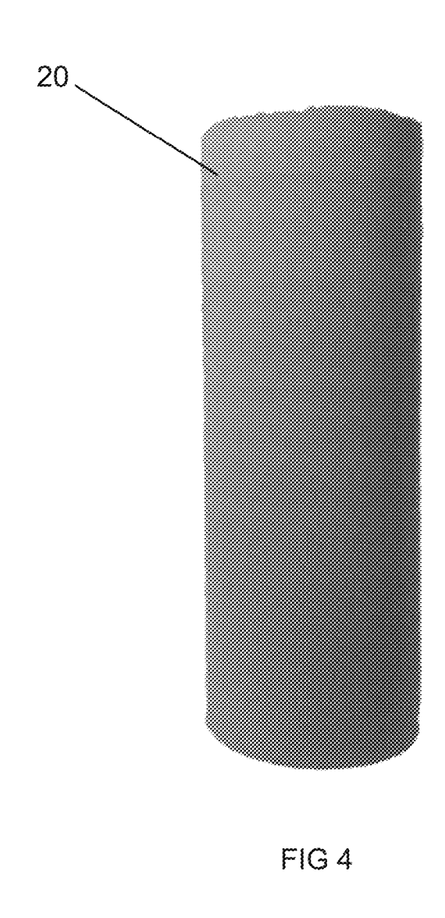
FIG. 4 is an image of a cylindrical-shaped rigid porous blank preform that was generated by pressing a WC/PMMA mixture in a cylindrical die, and then removing the PMMA binder by evaporation during heating followed by light sintering of the remaining WC powder particles during further heating.
Figure 5:
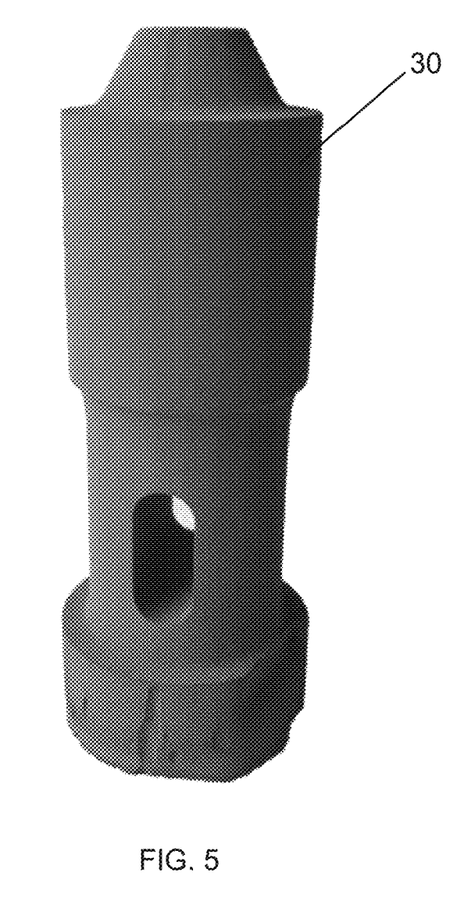
FIG. 5 is an image of a rigid porous shaped preform configured for producing a friction stir welding tool and fabricated by computer numerical controlled machining a cylindrical-shaped rigid porous blank preform of the type shown in FIG. 4.
Figure 6:
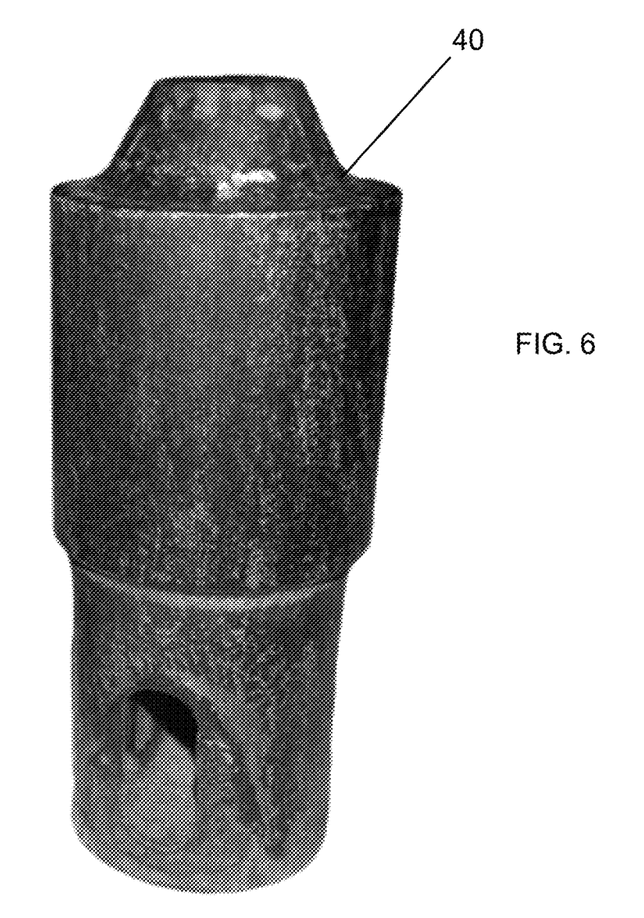
FIG. 6 is an image of a dense ZrC/W friction stir welding tool generated by reactive infiltration of a Zr-bearing fluid with a machined, porous, rigid WC preform of the type shown in FIG. 5.
Figure 10:
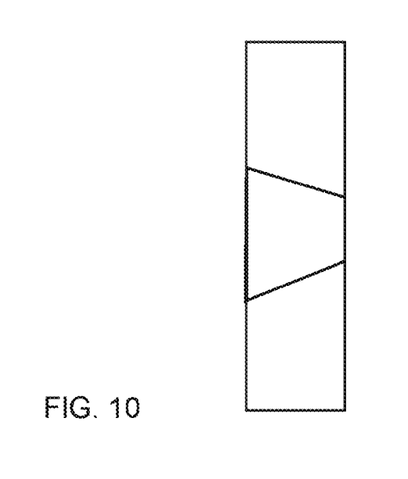
FIGS. 10 and 11 represent additional components that can be produced with reactive infiltration processes of the type depicted in FIGS. 7 through 9.

FIGS. 3 and 4 represent blank preforms 10 and 20 that can be used to produce a shaped preform 30 of the type shown in FIG. 5, which, after undergoing further processing as described herein, can produce a friction stir welding tool 40 as represented in FIGS. 1 and 2 and shown in FIG. 6. Although the invention will be described hereinafter in reference to the preforms 10, 20, and 30 and friction stir welding tool 40 shown in FIGS. 1 through 6 and adapted for use in joining operations, it will be appreciated that the teachings of the invention are also generally applicable to tools, components, and other articles of manufacture of types used in a variety of applications as discussed below, such as but not limited to extrusion dies and turbine blades, including those represented in FIGS. 10 and 11.

The friction stir welding tool 40 represented in FIGS. 1 and 2 and shown in FIG. 6 will be described as being formed as a ceramic or ceramic composite component, and particularly as a mechanically-robust ceramic or ceramic composite component suitable for high temperature applications. Ceramic composites are understood to be materials that contain more than one phase, with at least one of the phases being a ceramic material. The term "phase" is used herein to refer to (as in thermodynamics) a homogeneous volume of matter. The following disclosure will further describe methods of manufacturing such a component, and describe methods of using such a component in a friction stir welding process and system. However, other high-temperature systems are also encompassed by the teachings of the invention, depending on the particular article of manufacture, and nonlimiting examples of such systems include, but are not limited to, forming operation systems, joining operation systems, transportation systems, electrical power production systems, waste heat recovery systems, propulsion systems, national defense systems, chemical processing systems, and chemical and waste storage systems. Nonlimiting examples of systems for conducting forming operations include hot compaction, hot extrusion, hot pressing, hot drawing, hot rolling, casting, calendering, uniaxial or multiaxial compression, punching, stamping, forging, stretching, flanging, and contouring systems. Nonlimiting examples of joining systems include friction stir welding and arc welding systems. Nonlimiting examples of transportation systems include systems for automobiles, trucks, trains, aircraft, spacecraft, ships, and submarines. Nonlimiting examples of electrical power production systems include systems for fossil fuel-derived power, solar energy-derived power, nuclear energy-derived power, and thermionics. Nonlimiting examples of propulsion systems include systems for chemical fuel-based propulsion, nuclear fuel-based propulsion, and ion propulsion. Nonlimiting examples of national defense systems include systems for hypersonic aircraft, hypersonic missiles, and projectile systems, including such components as electromagnetic rail guns and gun barrel liners. Articles for such applications encompass a wide range of components, nonlimiting examples of which include dies (e.g., FIG. 10), molds, blades, rollers, punches, bearings, gears, wheels, pulleys, drive train components, machining tools, grinding tools, welding tools, pipes, containers, braking system components, and power plant and engine components (such as turbine blades (e.g., FIG. 11), valves, pump components, pistons, compressors, and combustion chambers), particularly in applications where such components may be exposed to high-temperature erosive fluids and/or particle streams. Such components may share one or more types of desirable properties, including but not limited to high melting temperatures, erosion resistance, stiffness, plastic deformation resistance, corrosion resistance, creep resistance, high fracture strength, high fracture toughness, high yield strength, high ultimate tensile strength, and/or high ultimate compression strength at high temperatures. As used herein, the term "mechanically robust" is used to identify a component that has one or more of the aforementioned high-temperature properties, particularly at temperatures above 600° C. and in some cases above 1400° C. Such mechanically-robust components may also share the capability of being manufactured to near-net shape and near-net size, and have intricate shapes.

As understood in the art, the friction stir welding tool 40 represented in FIGS. 1 and 2 and shown in FIG. 6 is intended to be used in a friction stir welding process to join metallic (metal and metal alloy) articles together without the need for melting their metallic compositions. By avoiding such melting, greater retention of the microstructure and properties of the bulk metallic compositions may be achieved in the joined regions by avoiding or at least minimizing the creation of a heat-affected zone (HAZ). During friction stir welding, metallic parts are abutting each other to define one or more interfaces therebetween, and the parts are welded together by causing the friction stir welding tool 40 to travel along the interfaces while the tool 40 is rotating and forcibly engaging the parts. The heat generated from the friction of the tool 40 against the parts acts to soften without melting the parts (that is, the parts become softer solids due to an increase in temperature below the melting points of their metallic compositions). The heated solid metallic parts can then plastically flow and intermix in the vicinity of the friction stir welding tool 40.

As previously noted, while friction stir welding has been attractive as a means of joining metallic materials that soften at relatively low temperatures (as nonlimiting examples, aluminum and its alloys), existing friction stir welding tools have not been suitable for welding metallic materials that soften at relatively higher temperatures, including but not limited to titanium and its alloys, nickel and its alloys, cobalt and its alloys, and iron and its alloys, which require a greater degree of friction-induced heating and higher temperatures to be joined by friction stir welding, which requires the friction stir welding tool 40 to undergo heating to higher temperatures. As a consequence, the friction stir welding tool 40 must also exhibit enhanced properties, including higher resistance to erosion, plastic deformation, and fracture at the required higher friction-induced temperature. Accordingly, the tool 40 disclosed herein is formed of materials that exhibit enhanced properties as compared to current materials used in friction stir welding tools, such as tungsten, tungsten alloys, monolithic carbides, and monolithic nitrides (for example, cubic boron nitride (CBN)).

In view of the above, the friction stir welding tool 40 depicted in FIGS. 1, 2, and 6 is produced from ceramic or ceramic composite materials suitable for use in high temperature applications, and in particular exhibit one or more of the aforementioned properties at high temperatures. In addition, the tool 40 is preferably formed to near-net shape and near-net dimensions. According to a particular aspect of the invention, the tool 40 is produced with a displacive compensation of porosity (DCP) process, preferably one or more of the processes described in detail in U.S. Pat. Nos. 6,407,022, 6,598,656, and 6,833,337 all to Sandhage et al., the contents of all of which are incorporated herein by reference in their entirety into this disclosure.

Briefly, the DCP processes disclosed in the Sandhage et al. patents include: synthesis or other acquisition of a porous solid preform with an appropriate composition, pore fraction, and overall shape; infiltration of the preform with a fluid reactant; and partial or complete reaction of the fluid reactant with the preform to produce a dense (nonporous) shaped body containing one or more desired ceramic phases. The pore volume of the preform is tailored so that a reaction-induced increase in solid volume occurs within the preform that partially or completely compensates for the porosity in the preform. It will be understood that the porous preform need only be sufficiently dimensionally stable to resist the capillary action of the infiltrated fluid reactant. The reaction is a displacement reaction of the following general type between a fluid (gas, liquid, or supercritical fluid) species, $M(g,l,scf)$, of the fluid reactant, and a solid reactant compound, $N_B X_C(s)$, of the porous preform:

where $MX_{C/A}(s)$ is a solid reaction product (X is a metalloid element, such as, for example, carbon, boron, oxygen, nitrogen, sulfur, etc.) and $N(s,l,g)$ is a solid or fluid (liquid or gas) reaction product. A, B and C are molar coefficients. Reactions are chosen such that the solid reaction product(s) (i.e., $MX_{C/A}(s)$ or $BN(s)$ and $MX_{C/A}(s)$) possess a reaction product volume that is larger than the solid volume of the solid reactant compound, $N_B X_C(s)$, in the preform, yielding an increase in solid volume upon reaction to fill the prior pore spaces within the shaped, porous $N_B X_C(s)$ preform; that is, the displacement reaction is used to compensate for the prior pore volume (displacive compensation of porosity).

The species (M) in the above reaction is referred to herein as a displacing metal of the fluid reactant, and can be any of one or more metals capable of replacing a displaceable species (N) of the $N_B X_C(s)$ solid reactant compound of the solid shaped porous preform. The displacing metal may comprise alkaline earth metal(s) including but not limited to magnesium, calcium, strontium, barium, and mixtures thereof. Alternatively, the displacing metal may comprise non-alkaline earth elements including but not limited to aluminum, chromium, hafnium, niobium, tantalum, titanium, vanadium, zirconium, and mixtures thereof. In certain embodiments, the displacing metal is a liquid metal contained within a liquid alloy whose composition may be chosen to have a liquidus temperature that is lower than the melting point of the displacing metal. The shaped porous preform may be any solid material or compound(s) adapted to contain the displaceable species, including but not limited to carbides, borides, oxides, sulfides, nitrides, and halides.

The DCP process may be used to synthesize a variety of ceramic and ceramic/metal composite compositions. Composites with a range of ceramic and metal phase compositions may be produced by the displacive compensation of porosity process provided that a thermodynamically-favored displacement reaction or reactions is/are utilized, and the reaction product volume of the solid reaction product(s) formed exceeds the volume of the solid reactant or reactants consumed.

The solid reaction product, $MX_{C/A}(s)$, may be any material including but not limited to compounds, solid solutions, or mixtures of one or more of carbides, borides, oxides, sulfides, nitrides, halides, or any combination thereof (as nonlimiting examples, compounds, solid solutions, or mixtures of carbonitrides, boronitrides, oxycarbides, oxynitrides, oxysulfides, oxyhalides, etc.). Various nonlimiting examples of the solid reaction product, $MX_{C/A}(s)$, include carbides of aluminum, boron, chromium, hafnium, manganese, molybdenum, niobium, scandium, silicon, tantalum, titanium, tungsten, vanadium, ytterbium, yttrium, and zirconium; borides of cobalt, chromium, hafnium, iron, lanthanum, magnesium, manganese, molybdenum, niobium, neodymium, nickel, rhenium, rhodium, silicon, tantalum, titanium, vanadium, tungsten, yttrium, ytterbium, and zirconium; nitrides of aluminum, boron, cerium, chromium, iron, hafnium, magnesium, manganese, molybdenum, niobium, nickel, silicon, tantalum, tin, titanium, vanadium, tungsten, yttrium, zinc, and zirconium; oxides of aluminum, barium, bismuth, boron, cadmium, calcium, cerium, cesium, chromium, cobalt, copper, indium, iron, hafnium, lithium, magnesium, manganese, molybdenum, niobium, nickel, potassium, silicon, sodium, strontium, tantalum, titanium, vanadium, tungsten, yttrium, and zirconium; and sulfides of aluminum, barium, bismuth, boron, cadmium, cerium, cesium, chromium, cobalt, copper, indium, iron, lanthanum, manganese, molybdenum, niobium, nickel, scandium, titanium, vanadium, tungsten, zinc, and zirconium.

The solid reaction product, $N(s)$, may be selected from metals, metal solid solutions, metal mixtures, and combinations of these types of materials. For instance, the solid reaction product, N(s), may include but is not limited to chromium, cobalt, copper, hafnium, iron, manganese, molybdenum, nickel, niobium, silicon, tantalum, titanium, tungsten, vanadium, yttrium, zirconium, and combinations thereof (as nonlimiting examples, compounds, solid solutions, or mixtures of multiple metals).

In the nonlimiting example of the friction stir welding tool 40, a porous preform may first be fabricated by using a powder (comprising the desired solid reactant compound, $N_BX_C(s)$) to produce a rigid porous shaped preform (e.g., the preform 30 of FIG. 5) having the desired shape for the friction stir welding tool 40. Such forming may be conducted by a process including but not limited to pressing of powder in a die with the die possessing the negative shape of the friction stir welding tool 40, powder injection molding in a die with the die possessing the negative shape of the friction stir welding tool 40, gel casting in a die with the die possessing the negative shape of the friction stir welding tool 40, additive manufacturing (for example, by three-dimensional printing of powder comprising the preform), or subtractive manufacturing (for example, by computer numerical controlled machining of a porous blank preform). As an example of a subtractive manufacturing approach, FIGS. 3 and 4 depict cylindrical-shaped blank preforms 10 and 20 from which the shaped preform 30 of FIG. 5 can be produced by computer numerical controlled machining. The porous shaped preform 30 is then converted into a ceramic or ceramic composite body possessing the desired friction stir welding tool shape using the shape-preserving DCP process.

The friction stir welding tool 40 may be formed by the DCP process outlined above to have a wide variety of ceramic and ceramic composite compositions, as also described above. Particular but nonlimiting examples include zirconium carbide/tungsten (ZrC/W) and zirconium carbide/molybdenum (ZrC/Mo) ceramic/metal (cermet) composite materials. ZrC/W composites offer a particularly attractive and unusual set of properties for friction stir welding tools. ZrC and W are ultra-high-melting (3445° C. and 3422° C., respectively) and chemically-compatible materials. ZrC and W do not react with each other to form other compounds and, in equilibrium with each other, retain a high solidus (liquid onset) temperature of about 2800° C. Unlike most cermets, ZrC/W composites are thermally compatible, in other words, ZrC and W have similar thermal expansion coefficients, and therefore are resistant to thermal cycling and shock. The ZrC phase endows ZrC/W composites with enhanced stiffness, enhanced resistance to plastic deformation, and enhanced erosion resistance at high temperatures (relative to pure tungsten or tungsten alloys, which are commonly used as friction stir welding tool materials), whereas tungsten endows ZrC/W composites with enhanced resistance to fracture at high temperatures (tungsten undergoes a brittle to ductile transformation at temperatures below 400° C.). As such, while the following will particularly discuss DCP processes that produce ZrC/W composites, it is foreseeable that other combinations of ceramics (e.g., $ZrB_2$) and/or metals (e.g., Mo) could be used, including the use of molybdenum as the displaceable species in a MoC and/or $Mo_2C$ solid reactant compound (for example, to produce the aforementioned ZrC/Mo composites), and $ZrB_2$ as the ceramic (for example, to produce a $ZrB_2$/W composite).

In the nonlimiting example in which the friction stir welding tool 40 is a ZrC/W composite, the ZrC/W composite is generated by providing a porous shaped preform (e.g., the preform 30 of FIG. 5) formed of WC and having the desired shape of the friction stir welding tool 40, and then infiltrating the WC preform with a zirconium-bearing fluid reactant. As noted previously, the porous WC-bearing shaped preform 30 can be produced by pressing a WC powder into a cylindrical shape in a cylindrical die to yield a cylindrical-shaped rigid blank preform 10 such as is shown in FIG. 3. Prior to compaction, the WC powder can be combined with one or more suitable binders, including but not limited to isobutyl methacrylate and polymethyl methacrylate (PMMA), the latter of which is a binder present in the blank preform 10 of FIG. 3. Once the WC/binder blank preform 10 is generated, the binder is removed by heating the preform 10 (such as by a process including but not limited to evaporation) and the WC powder particles are necked together (lightly sintered) during further heating to generate the WC-bearing cylindrical-shaped rigid porous blank preform 20 shown in FIG. 4. The blank preform 20 can then be machined (such as by a machining process including but not limited to computer numerical controlled machining) into a rigid porous shaped preform 30, shown in FIG. 5 as having the desired shape of the friction stir welding tool 40 shown in FIGS. 1 and 2.

In a particular but nonlimiting embodiment, the shaped preform 30 can then be immersed in a Zr-bearing liquid reactant to allow the reactant and its displacing metal (Zr) to infiltrate the WC-bearing shaped preform 30 and thereafter undergo the following reaction:

{Zr}+WC(s)=>ZrC(s)+W(s)

where {Zr} refers to zirconium present within the liquid reactant (a Zr-bearing fluid reactant), which may be but is not limited to a $Zr_2Cu$ liquid reactant. Because the solid ZrC and W products of this reaction possess a combined reaction product volume that is larger than the volume of the WC solid reactant compound of the shaped preform 30, this reaction converts the porous shaped preform 30 into a dense (nonporous) ZrC/W composite body that retains the shape and dimensions (to within a few percent) of the shaped preform 30; that is, the porous WC shaped preform 30 with the desired shape of the desired friction stir welding tool 40 is converted into a dense (nonporous) ZrC/W composite body that possesses the desired friction stir welding tool shape and dimensions, as seen in FIG. 6. Thereafter, the ZrC/W tool 40 may be coated with an oxidation-resistant and/or corrosion-resistant coating (for example, a pure metal (e.g., Cr), a metal alloy, a ceramic, a ceramic alloy, a metal composite, a ceramic composite, or any combination thereof) so as to enhance the oxidation resistance and/or corrosion resistance of the tool 40.

Due to the capability of the DCP process to produce a dense composite body that retains the shape and dimensions of the shaped preform 30, the composite body can be produced to have fine features that might otherwise be difficult to produce. As a nonlimiting example, the friction stir welding tool 40 shown in FIGS. 1 and 2 has threads 44 formed on a pin-type probe 42 of the tool 40 to promote the friction stir welding process. The threads 44 (or other fine features) can have dimensions of a few hundred micrometers or a few micrometers, yet may be produced on the preform 30 and retained in the tool 40 due to the capabilities of the DCP process. As another example, the tool 40 shown in FIGS. 1 and 2 has a cooling channel 46, which may define relatively thin walls (for example, thicknesses of a few millimeters) within the tool 40 that promote cooling of the tool 40, for example, by forcing cooling air through the channel 46. Analogously, fine features and/or cooling channels and/or thin wall thicknesses can be produced in the die depicted in FIG. 10 or the turbine blade depicted in FIG. 11.

Figure 11:
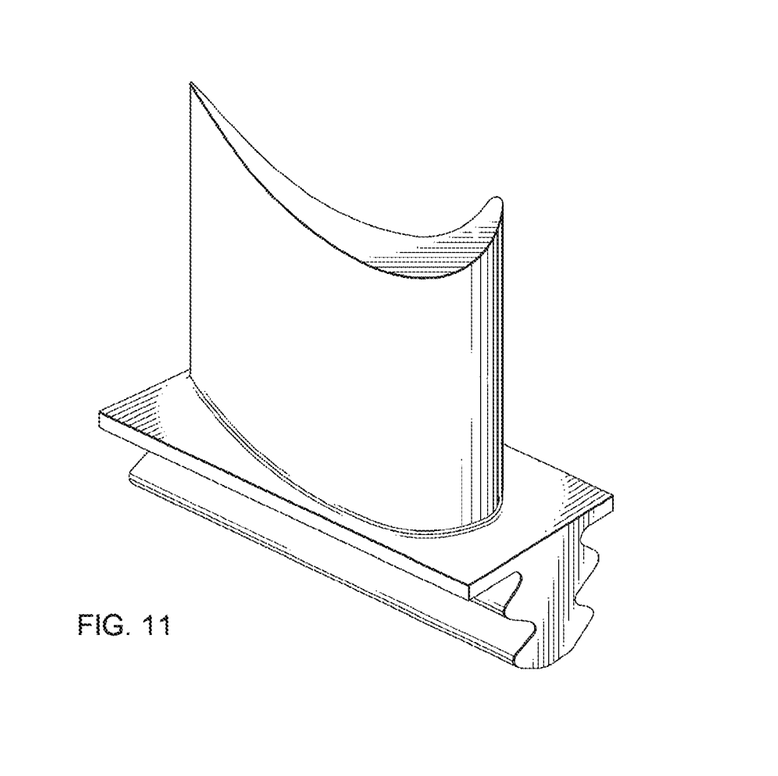

If another ZrC/W composite component is to be produced, for example, a turbine blade such as shown in FIG. 11, a WC-bearing porous shaped preform having the desired shape of a turbine blade can be similarly infiltrated with a zirconium-bearing fluid reactant to yield a desired ZrC/W composite composition. For complex shapes such as turbine plates, a porous rigid shaped preform may be produced by three-dimensional printing (such as by a three-dimensional printing process including but not limited to selective laser sintering) a WC powder into the desired shape of the blade. The shaped porous preform can then be immersed in a Zr-bearing fluid reactant to allow the fluid reactant to infiltrate the shaped preform and undergo the reaction indicated for the tool 30, such that the porous shaped preform with the desired shape of a turbine blade is converted into a dense ZrC/W composite body that possesses the desired turbine blade shape and dimensions. Thereafter, the ZrC/W turbine blade may be coated with an oxidation-resistant and/or corrosion-resistant coating (for example, a pure metal (e.g., Cr), a metal alloy, a ceramic, a ceramic alloy, a metal composite, a ceramic composite, or any combination thereof) so as to enhance the oxidation resistance and/or corrosion resistance of the ZrC/W turbine blade. The three-dimensional printing process may also be performed so that the turbine blade contains internal cooling channels to allow for cooling of the ZrC/W turbine blade during operation in a turbine engine.

This DCP process described above provides a cost-effective method for fabricating net-shape and net-size ceramic composites (i.e., without sintering shrinkage encountered in conventional ceramics processing and without the need for appreciable costly machining, or slow, costly, chemical etching of metallic materials). The resulting components may have high melting temperatures and may be mechanically, thermally, and/or chemically robust. As such, the application of such ceramic or ceramic composite components formed by the DCP process to high-temperature systems provides significant advantages over conventional high-temperature metallic materials or ceramic composites made by conventional methods.

By enabling the operation of friction stir welding tools at higher temperatures with enhanced erosion and enhanced fracture resistance relative to conventional friction stir welding tools, it is expected that the friction stir welding tool 40 as described herein will be more durable and capable of significantly enhanced operational life when used to friction stir weld metals that soften at relatively high temperatures (as nonlimiting examples, titanium and its alloys, nickel and its alloys, cobalt and its alloys, and iron and its alloys). Furthermore, by fabricating such friction stir welding tools with the use of the DCP process, it is possible to manufacture the tools in a more cost-effective manner relative to other conventional friction stir welding tools.

Similarly, by enabling the operation of turbine blades at higher temperatures with enhanced creep resistance, stiffness, and fracture resistance relative to conventional metal alloys, it is expected that such turbine blades may be used in engines operating at higher temperatures that can achieve significantly enhanced engine efficiency and/or significantly enhanced engine performance. The resulting component has a ceramic portion having a volume greater than the volume of the preform from which the displaceable species is displaced.

Figure 7:
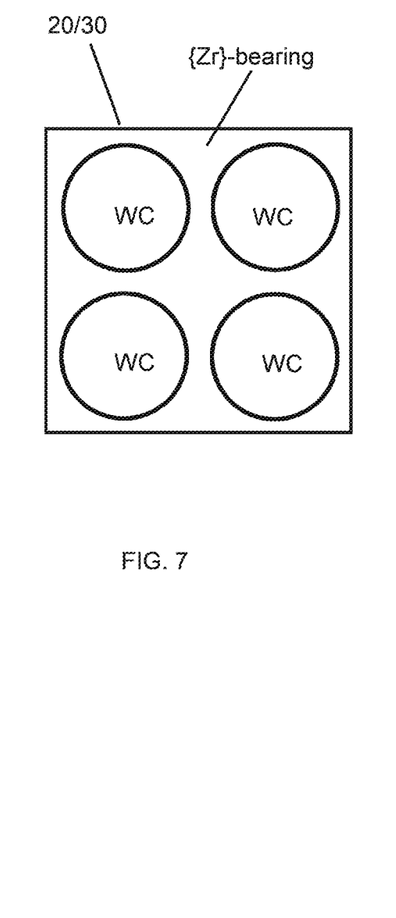
FIGS. 7 through 9 schematically depict steps in a reactive infiltration process that produced the tool of FIG. 6.
Figure 8:
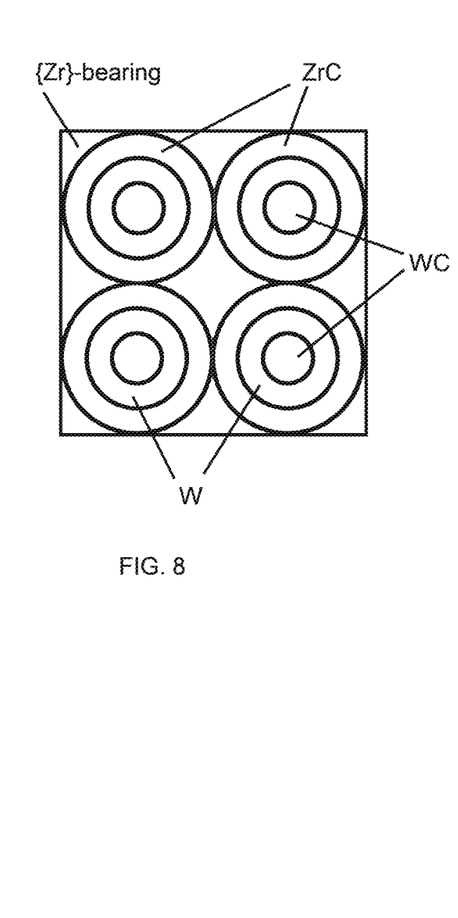
Figure 9:
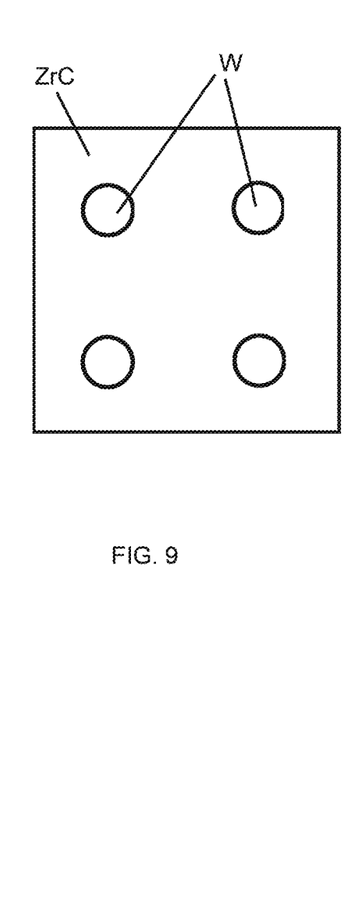

FIGS. 7 through 9 schematically illustrate steps in the DCP process, by which a fluid reactant comprising at least one displacing metal (fluid species, M(g,l,scf)) infiltrates and reacts with a rigid porous blank or shaped preform 20 or 30 having a pore volume and comprising a solid reactant compound, $N_BX_C(s)$ having at least one displaceable species (N), wherein the displacing metal (M) is capable of displacing the displaceable species (N) in the preform 20/30. In the embodiment in which a ZrC/W composite is produced, FIGS. 7 through 9 illustrate the aforementioned displacement reaction:

wherein zirconium metal is the displacing metal (M) of the fluid reactant, tungsten is the displaceable species (N) in the preform 20/30, and zirconium carbide is the solid reaction product (MX). FIG. 7 schematically illustrates a step in which the preform 20/30 (comprising sintered WC particles) has been infiltrated with a Zr-bearing fluid reactant (denoted by {Zr}). FIG. 8 schematically illustrates the fluid reactant as having partially reacted with the WC particles to yield solid W surrounding remnants of the WC particles, and is further surrounded by the ZrC reaction product. FIG. 9 is a schematic illustration showing the completion of the DCP process, wherein the WC solid reactant compound has been completely consumed to yield solid W dispersed in the ZrC solid reaction product. The solid W and Zr solid reaction product possess a combined reaction product volume that is about 2.01 times the volume of the WC solid reactant compound of the original preform 20/30. Hence, a rigid porous WC preform with less than or equal to about 50.2% porosity can be converted into a fully-dense ZrC/W-based composite by the infiltration and reaction of the WC solid reactant compound with Zr as the displacing metal of a fluid reactant, with little change in external dimensions (typically <1% dimensional changes).

In view of the above, the DCP process is capable of producing ceramic and ceramic composite components suitable for use in high temperature systems by infiltrating and reacting a rigid, porous preform comprising a solid reactant compound $N_BX_C(s)$ that contains a displaceable species (N), with a fluid reactant comprising at least one displacing metal (fluid species, M(g,l,scf)), wherein the displacing metal is capable of at least partially displacing (replacing) the displaceable species in the solid reactant compound $N_BX_C(s)$ to yield a ceramic portion having a volume greater than the volume of the preform from which the displaceable species was displaced.

While the present disclosure has been described with reference to certain embodiments, it will be apparent to those of ordinary skill in the art that other embodiments and implementations are possible that are within the scope of the present disclosure without departing from the spirit and scope of the present disclosure. For example, materials other than those noted could be employed or produced by the process, and the resulting components could be employed in high-temperature applications other than those described. Accordingly, it should be understood that the invention is not limited to any embodiment described herein. It should also be understood that the phraseology and terminology employed above are for the purpose of describing the disclosed embodiments, and do not necessarily serve as limitations to the scope of the disclosure. It should also be understood that the phraseology and terminology employed above are for the purpose of describing the disclosed and illustrated embodiments, and do not necessarily serve as limitations to the scope of the invention. Therefore, the scope of the invention is to be limited only by the following claims.

The invention claimed is:

1. A mechanically robust ceramic or ceramic composite component for a high temperature system, the mechanically-robust ceramic or ceramic composite component prepared by a method comprising:

reacting a fluid reactant and a porous preform that has a pore volume and contains a solid reactant compound that defines a solid volume of the porous preform, the solid volume of the porous preform including a thread having a dimension of a few hundred micrometers or less and a channel with a wall thickness of a few millimeters or less, the fluid reactant comprising at least one displacing metal and the solid reactant compound of the preform having at least one displaceable species, the at least one displacing metal of the fluid reactant being capable of displacing the at least one displaceable species in the solid reactant compound to produce at least one solid reaction product; and allowing the fluid reactant to infiltrate the porous preform and react with the solid reactant compound to produce the mechanically-robust ceramic or ceramic composite component, during which the at least one displacing metal at least partially replaces the at least one displaceable species to produce the at least one solid reaction product that has a reaction product volume, and the pore volume is at least partially filled by the reaction product volume; and wherein the mechanically-robust ceramic or ceramic composite component comprises the at least one displaceable species and the at least one solid reaction product, and the mechanically-robust ceramic or ceramic composite component includes the thread having a dimension of a few hundred micrometers or less and the channel with a wall thickness of a few millimeters or less.

2. The mechanically robust ceramic or ceramic composite component of claim 1, wherein the mechanically-robust ceramic or ceramic composite component comprises at least one of zirconium carbide/tungsten (ZrC/W) ceramic/metal and zirconium carbide/molybdenum (ZrC/Mo) ceramic/metal.

3. The mechanically-robust ceramic or ceramic composite component of claim 1, wherein the mechanically-robust ceramic or ceramic composite component is coated with a layer of an oxidation resistant and/or corrosion resistant material.

4. The mechanically-robust ceramic or ceramic composite component of claim 3, wherein the layer of the oxidation resistant and/or corrosion resistant material comprises a pure metal, a metal alloy, a ceramic, a ceramic alloy, a metal composite, a ceramic composite, or any combination thereof.

5. The mechanically robust ceramic or ceramic composite component of claim 1, wherein the mechanically-robust ceramic or ceramic composite component is a component of a system for a forming operation, a joining operation, a transportation system, an electrical power production system, a waste heat recovery system, a propulsion system, a national defense system, a chemical processing system, and a chemical and waste storage system.

6. The mechanically-robust ceramic or ceramic composite component of claim 1, wherein the mechanically-robust ceramic or ceramic composite component is a friction stir welding tool.

7. The mechanically-robust ceramic or ceramic composite component of claim 1, wherein the mechanically-robust ceramic or ceramic composite component is a die and the porous preform possesses a shape of the die.

8. The mechanically-robust ceramic or ceramic composite component of claim 1, wherein the mechanically-robust ceramic or ceramic composite component is a turbine blade and the porous preform possesses a shape of the turbine blade.

9. The mechanically-robust ceramic or ceramic composite component of claim 1, wherein the mechanically robust ceramic or ceramic composite component consists of the at least one displaceable species and the at least one solid reaction product.

10. The mechanically-robust ceramic or ceramic composite component of claim 1, wherein the at least one displaceable species is dispersed in the at least one solid reaction product.

* * * * *